United States Patent
Horikoshi et al.

(10) Patent No.: US 6,812,280 B2
(45) Date of Patent: Nov. 2, 2004

(54) ORGANOPOLYSILOXANE COMPOSITIONS

(75) Inventors: Jun Horikoshi, Gunma-ken (JP); Tsuneo Kimura, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/411,202

(22) Filed: Apr. 11, 2003

(65) Prior Publication Data

US 2003/0195322 A1 Oct. 16, 2003

(30) Foreign Application Priority Data

Apr. 12, 2002 (JP) ........................................ 2002-110496

(51) Int. Cl.⁷ ............................................... C08L 83/04
(52) U.S. Cl. .................... 524/588; 428/405; 528/31; 528/32; 528/24
(58) Field of Search .................. 428/405; 524/588; 528/31, 32, 24

(56) References Cited

U.S. PATENT DOCUMENTS 3,944,705 A * 3/1976 Fujioka et al. .............. 428/331

FOREIGN PATENT DOCUMENTS

| JP | 4-293963 A | 10/1992 |
|---|---|---|
| JP | 5-65417 A | 3/1993 |
| JP | 5-239360 A | 9/1993 |
| JP | 7-41562 A | 2/1995 |
| JP | 7-179760 A | 7/1995 |
| JP | 7-292251 A | 11/1995 |
| JP | 8-12889 A | 1/1996 |
| JP | 9-124945 A | 5/1997 |
| JP | 9-194753 A | 7/1997 |
| JP | 9-328615 A | 12/1997 |
| JP | 10-204300 A | 8/1998 |
| JP | 10-292102 A | 11/1998 |

* cited by examiner

*Primary Examiner*—Kuo-Liang Peng
(74) *Attorney, Agent, or Firm*—Birch, Stewart, Kolasch & Birch, LLP

(57) ABSTRACT

An inorganic filler which has been surface coated with an addition cure silicone composition in the cured state is included in an organopolysiloxane composition, which becomes effective for preventing the filler from settling down even during long-term shelf storage.

12 Claims, No Drawings

ORGANOPOLYSILOXANE COMPOSITIONS

TECHNICAL FIELD

This invention relates to an organopolysiloxane composition which is heavily loaded with an inorganic filler, but effective for preventing the filler from settling down.

BACKGROUND ART

In the past, organopolysiloxane compositions are widely used in various applications as adhesives, coatings, electrically insulating sealants, and building sealants.

For reinforcement and similar purposes, fillers are often used in organopolysiloxane compositions. However, when organopolysiloxane compositions heavily loaded with inorganic fillers are stored for a long term in the uncured state, the inorganic fillers tend to settle down with the passage of time. This tendency becomes outstanding especially when the organopolysiloxane is liquid.

SUMMARY OF THE INVENTION

An object of the present invention is to provide a filled organopolysiloxane composition which is effective for preventing the filler from settling down during long-term storage.

It has been found that when an inorganic filler which has been surface coated with an addition cure silicone composition in the cured state is added to an organopolysiloxane composition, the surface coating prevents the filler from settling down during storage, that is, the organopolysiloxane composition is endowed with an anti-settling effect.

The present invention provides an organopolysiloxane composition comprising an organopolysiloxane as a base polymer and an inorganic filler which has been surface coated with an addition cure silicone composition in the cured state.

DESCRIPTION OF THE PREFERRED EMBODIMENTS

The organopolysiloxane composition of the present invention contains an inorganic filler which has been surface coated with an addition cure silicone composition in the cured state.

The addition cure silicone composition with which the inorganic filler is coated includes an organopolysiloxane as a main component or base polymer, a crosslinking agent, and an addition reaction catalyst.

The organopolysiloxane used herein as the base polymer preferably has the following average compositional formula (1).

$$R_a SiO_{(4-a)/2} \tag{1}$$

Herein R is the same or different and selected from substituted or unsubstituted monovalent hydrocarbon groups, preferably having 1 to 12 carbon atoms, more preferably 1 to 10 carbon atoms, for example, alkyl groups such as methyl, ethyl, propyl, butyl, 2-ethylbutyl, and octyl, cycloalkyl groups such as cyclohexyl and cyclopentyl, alkenyl groups such as vinyl, hexenyl and allyl, aryl groups such as phenyl, tolyl, xylyl, naphthyl and diphenyl, aralkyl groups such as benzyl and phenylethyl, and substituted ones of the foregoing groups in which some or all of the hydrogen atoms attached to carbon atoms are substituted with halogen atoms, cyano groups or the like, such as chloromethyl, trifluoropropyl, 2-cyanoethyl and 3-cyanopropyl, and similar groups which are substituted with or contain an amino, ether (—O—), carbonyl (—CO—), carboxyl (—COOH), or sulfonyl (—SO$_2$—) group or the like. Of these, methyl, vinyl, phenyl and trifluoropropyl are preferred, with methyl being most preferred. It is preferred that methyl account for at least 80 mol %, especially at least 90 mol % of R. The subscript "a" is 1.90 to 2.05.

The organopolysiloxane used should contain at least two alkenyl groups, typically vinyl groups, in a molecule. The alkenyl groups may be positioned at the ends of or within the molecular chain.

The organopolysiloxane should preferably have a viscosity of about 50 to about 1,000,000 centistokes (cSt) at 25° C., especially about 100 to about 500,000 cSt at 25° C.

Used as the crosslinking agent is an organohydrogenpolysiloxane having at least two hydrogen atoms each attached to a silicon atom in a molecule, that is, at least two SiH groups, preferably at least three SiH groups in a molecule. The organohydrogenpolysiloxane used herein may be selected from well-known ones and typically has the average compositional formula (2).

$$R'_b H_c SiO_{(4-b-c)/4} \tag{2}$$

Herein R' is a substituted or unsubstituted monovalent hydrocarbon group having 1 to 12 carbon atoms, preferably 1 to 10 carbon atoms, as defined above for R, but preferably free of aliphatic unsaturation. The subscripts b and c are numbers satisfying $0 \leq b < 3$, preferably $0.7 \leq b \leq 2.1$, $0 < c \leq 3$, preferably $0.002 \leq c \leq 1$, and $0 < b+c \leq 3$, preferably $0.8 \leq b+c \leq 3$.

The organohydrogenpolysiloxane preferably has a viscosity of up to 300 cSt at 25° C. It is used in such an amount as to give 0.3 to 10 moles, especially 0.5 to 5 moles of SiH groups per mole of alkenyl groups in the organopolysiloxane (A).

The addition reaction catalyst may be selected from well-known catalysts, preferably Group VIII metals and compounds thereof, especially platinum compounds. Typical platinum compounds include chloroplatinic acid and complexes of platinum with olefins or the like. The addition reaction catalyst is used in a catalytic amount, preferably about 0.1 to 2,000 ppm, more preferably about 1 to 500 ppm of Group VIII metal based on the weight of organopolysiloxane as the base polymer.

The addition cure silicone composition with which the inorganic filler is coated should preferably have a hardness of up to 20, especially up to 5 on Durometer A scale after it is cured. The lower limit of cured hardness is preferably at least 200, especially at least 150, as expressed by ¼ cone penetration.

The inorganic filler to be coated with the addition cure silicone composition is selected from metals such as gold, silver, copper and aluminum, metal oxides such as silver oxide, copper oxide, aluminum oxide, titanium oxide, iron oxide and zinc oxide, metal hydroxides such as aluminum hydroxide, metal carbonates such as calcium carbonate, magnesium carbonate and zinc carbonate, and nitrides serving as heat transfer improvers such as boron nitride, aluminum nitride, silicon nitride and carbon nitride, alone or in admixture of two or more. The preferred inorganic fillers are silver, copper, aluminum, aluminum oxide, titanium oxide, aluminum hydroxide, boron nitride and aluminum nitride.

On the surface of the inorganic filler, preferably 1 to 1,000 parts, more preferably 5 to 500 parts by weight of the addition cure silicone composition is coated per 100 parts by weight of the inorganic filler. Outside the range, the effect of preventing the inorganic filler from settling down may become insufficient.

The surface coated inorganic filler is readily prepared by uniformly mixing the inorganic filler with the addition cure silicone composition and curing the silicone composition to the filler surface. Mixing may be done while heating for promoting the cure. For example, the silicone composition will be rapidly cured by mixing for about 30 to 150 minutes while heating at a temperature of 60 to 150° C. Such heat mixing promotes formation of the surface coated inorganic filler. An alternative procedure involves premixing the components of the silicone composition intimately, curing the composition, then adding the inorganic filler thereto and mixing.

The organopolysiloxane composition of the invention is characterized by the inclusion of an inorganic filler which has been surface coated with an addition cure silicone composition in the cured state, as noted above. The organopolysiloxane composition includes an organopolysiloxane as a main component or base polymer. The curing mode used herein is not critical. For example, organopolysiloxane compositions of well-known condensation cure, addition cure, organic peroxide cure and radiation cure types may be used. Of these, condensation cure and addition cure types are preferred.

Like in the coating silicone composition, the organopolysiloxane used herein preferably has the average compositional formula (1).

$$R_aSiO_{(4-a)/2} \qquad (1)$$

Herein R is the same or different and selected from substituted or unsubstituted monovalent hydrocarbon groups, preferably having 1 to 12 carbon atoms, more preferably 1 to 10 carbon atoms, for example, alkyl groups such as methyl, ethyl, propyl, butyl, 2-ethylbutyl, and octyl, cycloalkyl groups such as cyclohexyl and cyclopentyl, alkenyl groups such as vinyl, hexenyl and allyl, aryl groups such as phenyl, tolyl, xylyl, naphthyl and diphenyl, aralkyl groups such as benzyl and phenylethyl, and substituted ones of the foregoing groups in which some or all of the hydrogen atoms are substituted with halogen atoms, cyano groups or the like, such as chloromethyl, trifluoropropyl, 2-cyanoethyl and 3-cyanopropyl, and similar groups which are substituted with or contain an amino, ether (—O—), carbonyl (—CO—), carboxyl (—COOH), or sulfonyl (—SO$_2$—) group or the like. Of these, methyl, vinyl, phenyl and trifluoropropyl are preferred. The subscript "a" is 1.90 to 2.05.

In a first embodiment wherein the organopolysiloxane composition is of the condensation cure type, the base polymer is a diorganopolysiloxane blocked at either end of the molecular chain with a hydroxyl group or an organoxy group such as an alkoxy group of 1 to 4 carbon atoms. In order that the composition cure into a product having satisfactory rubber physical properties and mechanical strength, the organopolysiloxane used should preferably have a viscosity at 25° C. of at least 25 cSt, more preferably 100 to 1,000,000 cSt, most preferably 200 to 500,000 cSt.

In the organopolysiloxane composition of condensation cure type, a crosslinking agent is used which is preferably a silane or siloxane compound having at least two hydrolyzable groups in a molecule. Exemplary of suitable hydrolyzable groups are alkoxy groups such as methoxy, ethoxy and butoxy, ketoxime groups such as dimethyl ketoxime and methyl ethyl ketoxime, acyloxy groups such as acetoxy, alkenyloxy groups such as isopropenyloxy and isobutenyloxy, amino groups such as N-butylamino and N,N-diethylamino, and amide groups such as N-methylacetamide. The crosslinking agent is preferably compounded in an amount of 2 to 50 parts, more preferably 5 to 20 parts by weight per 100 parts by weight of the both end hydroxyl or organoxy group-blocked organopolysiloxane.

In the organopolysiloxane composition of condensation cure type, a curing catalyst is often used. Suitable curing catalysts include alkyltin esters such as dibutyltin diacetate, dibutyltin dilaurate, and dibutyltin dioctoate; titanates and titanium chelates such as tetraisopropoxytitanium, tetra-n-butoxytitanium, tetrakis(2-ethylhexoxy)titanium, dipropoxybis(acetyl-acetonato)titanium, and titanium isopropoxyoctylene glycol; organometallic compounds such as zinc naphthenate, zinc stearate, zinc 2-ethyloctoate, iron 2-ethylhexoate, cobalt 2-ethylhexoate, manganese 2-ethylhexoate, cobalt naphthenate, and alkoxyaluminum compounds; aminoalkyl group-substituted alkoxysilanes such as 3-aminopropyltriethoxysilane and N-β-(aminoethyl)-γ-aminopropyltrimethoxysilane; amine compounds and salts thereof such as hexylamine and phosphoric acid dodecylamine; quaternary ammonium salts such as benzyl triethylammonium acetate; alkali metal salts of lower fatty acids such as potassium acetate, sodium acetate and lithium oxalate; dialkylhydroxylamines such as dimethylhydroxylamine and diethylhydroxylamine; and silane and siloxane compounds having a guanidyl group such as tetramethylguanidylpropyl-trimethoxysilane, tetramethylguanidylpropylmethyldimethoxy-silane and tetramethylguanidylpropyltris(trimethylsiloxy)-silane. They may be used alone or in admixture. The curing catalyst is preferably compounded in an amount of 0 to 10 parts, more preferably 0.01 to 5 parts by weight per 100 parts by weight of the organopolysiloxane.

In a second embodiment wherein the organopolysiloxane composition is of the addition cure type, the base polymer is an organopolysiloxane having at least two alkenyl groups, preferably vinyl groups, at the end and/or within the molecular chain. This organopolysiloxane may be either liquid or gum, and preferably has a viscosity of about 100 to about 20,000,000 cSt at 25° C.

Used as the crosslinking agent is an organohydrogenpolysiloxane having at least two, preferably at least three hydrogen atoms each attached to a silicon atom (SiH groups) in a molecule. This organohydrogenpolysiloxane may be selected from well-known ones, typically those having the average compositional formula (2) shown above, and preferably those having a viscosity of up to 300 cSt at 25° C. The organohydrogenpolysiloxane is preferably used in such an amount as to give 0.3 to 10 moles, more preferably 0.5 to 5 moles of SiH groups per mole of alkenyl groups in the organopolysiloxane as the main component.

To the composition, a curing catalyst may be added in a catalytic amount. The addition reaction catalyst may be selected from well-known catalysts, preferably Group VIII metals and compounds thereof, especially platinum compounds. Typical platinum compounds include chloroplatinic acid and complexes of platinum with olefins or the like. The catalyst is preferably used in an amount of about 0.1 to 2,000 ppm, more preferably about 1 to 500 ppm of Group VIII metal based on the weight of organopolysiloxane as the base polymer.

In a third embodiment wherein the organopolysiloxane composition is a silicone rubber composition of the organic peroxide cure type, the base polymer is an organopolysiloxane which is preferably gum-like, that is, having a viscosity at 25° C. of about 100,000 to about 20,000,000 cSt, especially about 1,000,000 to about 10,000,000 cSt and containing at least two alkenyl groups (typically vinyl groups) at the end of and/or within the molecular chain.

Organic peroxides are used as the curing catalyst. Suitable organic peroxides include alkyl peroxides such as dicumyl peroxide and di-t-butyl peroxide, and acyl peroxides such as benzoyl peroxide and 2,4-dichlorobenzoyl peroxide. The organic peroxide is preferably used in an amount of 0.1 to 10 parts, more preferably 0.2 to 5 parts by weight per 100 parts by weight of the organopolysiloxane as the base polymer.

In a fourth embodiment wherein the organopolysiloxane composition is a silicone rubber composition of the radiation cure type, the base polymer is an organopolysiloxane containing at least two groups selected from the class consisting of aliphatic unsaturated groups (e.g., vinyl, allyl, alkenyloxy, acrylic and methacrylic), mercapto, epoxy and hydrosilyl groups at the end of and/or within the molecular chain. It preferably has a viscosity of about 100 to about 1,000,000 cSt at 25° C.

A reaction initiator is used in this embodiment. Suitable initiators, as are well known in the art, include acetophenone, propiophenone, benzophenone, xanthol, fluorein, benzaldehyde, anthraquinone, triphenylamine, carbazole, 3-methylacetophenone, 4-methylacetophenone, 3-pentylacetophenone, 4-methoxyacetophenone, 3-bromoacetophenone, 4-allylacetophenone, p-diacetylbenzene, 3-methoxybenzophenone, 4-methylbenzophenone, 4-chlorobenzophenone, 4,4'-dimethoxybenzophenone, 4-chloro-4'-benzylbenzophenone, 3-chloroxanthol, 3,9-dichloroxanthol, 3-chloro-8-nonylxanthol, benzoin, benzoin methyl ether, benzoin butyl ether, bis(4-dimethylaminophenyl)ketone, benzylmethoxyketal, and 2-chlorothioxanthol. The initiator is preferably used in an amount of 0.1 to 20 parts, more preferably 0.5 to 10 parts by weight per 100 parts by weight of the organopolysiloxane as the base polymer.

According to the invention, the inorganic filler which has been surface coated with the addition cure type silicone composition in the cured state is added to the organopolysiloxane composition of any desired cure type as mentioned above. The resulting organopolysiloxane composition is effective for preventing the inorganic filler from settling down even when it is shelf stored for a long period of time, that is, has improved anti-settling effect.

An appropriate amount of the inorganic filler coated with the addition cure type silicone composition in the cured state is about 10 to about 10,000 parts, more preferably about 50 to about 5,000 parts, most preferably about 100 to about 2,000 parts by weight per 100 parts by weight of the organopolysiloxane as the base polymer in the organopolysiloxane composition.

In addition to the inorganic filler coated with the addition cure type silicone composition in the cured state, any of other fillers may be compounded in the organopolysiloxane composition if necessary and as long as it does not compromise the object of the invention. Such other fillers include finely divided silica, silica aerogel, precipitated silica, diatomaceous earth, metal oxides such as iron oxide, zinc oxide, titanium oxide, and aluminum oxide, metal nitrides such as boron nitride and aluminum nitride, metal carbonates such as calcium carbonate, magnesium carbonate, and zinc carbonate, asbestos, glass wool, carbon black, mica fines, fused silica powder, and powder synthetic resins such as polystyrene, polyvinyl chloride, and polypropylene. These other fillers may be compounded in any desired amount as long as this does not compromise the object of the invention. Preferably the other fillers are dried to remove moisture prior to use. The other fillers may or may not be surface treated with a suitable agent such as silane coupling agents, organopolysiloxane or fatty acids.

The inventive organopolysiloxane composition may include additives such as pigments, dyes, anti-aging agents, antioxidants, antistatic agents, and flame retardants (e.g., antimony oxide and chlorinated paraffin).

Other useful additives include thixotropic improvers such as polyethers, mildew-proofing agents, anti-fungal agents, and adhesive aids such as aminosilanes (e.g., γ-aminopropyltriethoxysilane and 3-2-(aminoethylamino) propyltrimethoxysilane) and epoxysilanes (e.g., γ-glycidoxypropyltrimethoxysilane and β-(3,4-epoxycyclohexyl)ethyltrimethoxysilane).

The inventive organopolysiloxane composition is prepared by intimately mixing the above-mentioned components and optionally, other fillers and various additives in a dry atmosphere. With respect to the curing conditions for the inventive organopolysiloxane composition, any conventional curing process may be employed depending on a particular cure type.

EXAMPLE

Examples of the invention are given below by way of illustration and not by way of limitation. All parts are by weight and the viscosity is a measurement (in centistoke) at 25° C.

Preparation Example 1 of Coated Inorganic Filler

To 100 parts of dimethylpolysiloxane capped with a vinyl group at either end of its molecular chain and having a viscosity of 1,000 cSt were added 6 parts of methylhydrogenpolysiloxane containing, on the average, 16 SiH groups on side chains and having a viscosity of 100 cSt and an amount of a vinylsiloxane complex of chloroplatinic acid to give 10 ppm of platinum based on the total weight of the mixture. There was further added 500 parts of alumina powder (AS-30 by Showa Denko K. K., average particle size 16 μm) as an inorganic filler. The mixture was continuously mixed under vacuum for 2 hours while heating at 120° C. This yielded Coated Inorganic Filler A.

Example 1

To 100 parts of dimethylpolysiloxane capped with a hydroxyl group at either end of its molecular chain and having a viscosity of 5,000 cSt were added 10 parts of phenyltri(isopropenyloxy)silane, 1 part of 3-aminopropyl-triethoxysilane, 0.8 part of 1,1,3,3-tetramethyl-2-[3-(trimethoxysilyl)propyl]guanidine, 480 parts of Coated Inorganic Filler A, and 320 parts of alumina (AS-30). The ingredients were mixed under anhydrous conditions and then under defoaming conditions, obtaining an end composition.

Example 2

To 100 parts of dimethylpolysiloxane capped with a vinyl group at either end of its molecular chain and having a viscosity of 5,000 cSt were added 6 parts of methylhydrogen-polysiloxane containing, on the average, 16 SiH groups on side chains and having a viscosity of 100 cSt and an amount of a vinylsiloxane complex of chloroplatinic acid to give 10 ppm of platinum based on the total weight of the mixture. There were further added 0.15 part of a 50% toluene solution of ethynylcyclohexanol, 480 parts of Coated Inorganic Filler A, and 320 parts of alumina (AS-30). The ingredients were mixed under anhydrous conditions and then under defoaming conditions, obtaining an end composition.

Example 3

To 100 parts of dimethylpolysiloxane capped with a vinyl group at either end of its molecular chain and having a viscosity of 5,000 cSt were added 1 part of dicumyl peroxide, 480 parts of Coated Inorganic Filler A, and 320 parts of alumina (AS-30). The ingredients were mixed under anhydrous conditions and then under defoaming conditions, obtaining an end composition.

Example 4

To 100 parts of dimethylpolysiloxane having a viscosity of 5,000 cSt were added 480 parts of Coated Inorganic Filler A and 320 parts of alumina (AS-30). The ingredients were mixed under anhydrous conditions and then under defoaming conditions, obtaining an end composition.

Preparation Example 2 of Coated Inorganic Filler

To 100 parts of dimethylpolysiloxane capped with a vinyl group at either end of its molecular chain and having a viscosity of 1,000 cSt were added 6 parts of methylhydrogenpolysiloxane containing, on the average, 16 SiH groups on side chains and having a viscosity of 100 cSt and an amount of a vinylsiloxane complex of chloroplatinic acid to give 10 ppm of platinum based on the total weight of the mixture. There was further added 500 parts of copper powder (FCC-SP-99 by Fukuda Metal Foil & Powder Co., Ltd., 50% particle size <13 µm) as an inorganic filler. The mixture was continuously mixed under vacuum for 2 hours while heating at 120° C. This yielded Coated Inorganic Filler B.

Example 5

To 100 parts of dimethylpolysiloxane capped with a hydroxyl group at either end of its molecular chain and having a viscosity of 5,000 cSt were added 10 parts of phenyltri(isopropenyloxy)silane, 1 part of 3-aminopropyltriethoxysilane, 0.8 part of 1,1,3,3-tetramethyl-2-[3-(trimethoxysilyl)propyl]guanidine, 480 parts of Coated Inorganic Filler B, and 320 parts of copper powder (FCC-SP-99). The ingredients were mixed under anhydrous conditions and then under defoaming conditions, obtaining an end composition.

Comparative Example 1

To 100 parts of dimethylpolysiloxane capped with a hydroxyl group at either end of its molecular chain and having a viscosity of 5,000 cSt were added 10 parts of phenyltri(isopropenyloxy)silane, 1 part of 3-aminopropyltriethoxysilane, 0.8 part of 1,1,3,3-tetramethyl-2-[3-(trimethoxysilyl)propyl]guanidine, and 400 parts of alumina (AS-30). The ingredients were mixed under anhydrous conditions and then under defoaming conditions, obtaining an end composition.

Comparative Example 2

To 100 parts of dimethylpolysiloxane capped with a vinyl group at either end of its molecular chain and having a viscosity of 5,000 cSt were added 6 parts of methylhydrogen-polysiloxane containing, on the average, 16 SiH groups on side chains and having a viscosity of 100 cSt and an amount of a vinylsiloxane complex of chloroplatinic acid to give 10 ppm of platinum based on the total weight of the mixture. There were further added 0.15 part of a 50% toluene solution of ethynylcyclohexanol and 400 parts of alumina (AS-30). The ingredients were mixed under anhydrous conditions and then under defoaming conditions, obtaining an end composition.

Comparative Example 3

To 100 parts of dimethylpolysiloxane capped with a vinyl group at either end of its molecular chain and having a viscosity of 5,000 cSt were added 1 part of dicumyl peroxide and 400 parts of alumina (AS-30). The ingredients were mixed under anhydrous conditions and then under defoaming conditions, obtaining an end composition.

Comparative Example 4

To 100 parts of dimethylpolysiloxane having a viscosity of 5,000 cSt was added 400 parts of alumina (AS-30). The ingredients were mixed under anhydrous conditions and then under defoaming conditions, obtaining an end composition.

Comparative Example 5

To 100 parts of dimethylpolysiloxane capped with a hydroxyl group at either end of its molecular chain and having a viscosity of 5,000 cSt were added 10 parts of phenyltri(isopropenyloxy)silane, 1 part of 3-aminopropyltriethoxysilane, 0.8 part of 1,1,3,3-tetramethyl-2-[3-(trimethoxysilyl)propyl]guanidine, and 400 parts of copper powder (FCC-SP-99). The ingredients were mixed under anhydrous conditions and then under defoaming conditions, obtaining an end composition.

Preparation Example 3 of Coated Inorganic Filler

A mixture of 1 part of vinyltrimethoxysilane, 10 parts of water and 100 parts of alumina (AS-30) as an inorganic filler was agitated for 24 hours at room temperature and dried, yielding Coated Inorganic Filler C.

Comparative Example 6

To 100 parts of dimethylpolysiloxane capped with a hydroxyl group at either end of its molecular chain and having a viscosity of 5,000 cSt were added 10 parts of phenyltri(isopropenyloxy)silane, 1 part of 3-aminopropyltriethoxysilane, 0.8 part of 1,1,3,3-tetramethyl-2-[3-(trimethoxysilyl)propyl]guanidine, and 400 parts of Coated Inorganic Filler C. The ingredients were mixed under anhydrous conditions and then under defoaming conditions, obtaining an end composition.

Each composition prepared in Examples 1–5 and Comparative Examples 1–6 was placed in a glass bottle, which was allowed to stand at 23° C. At the initial and after 1 week, 1, 2 and 3 months of storage, the composition in the bottle was examined for shelf stability, i.e., whether or not the filler settled down. It was rated according to the following criterion.

OK: no filler settled, good shelf stability

Fair: some filler settled on the bottom

NG: separated into two layers, oil and filler layers

The results are shown in Tables 1 and 2.

TABLE 1

|  | Example | | | | |
| --- | --- | --- | --- | --- | --- |
|  | 1 | 2 | 3 | 4 | 5 |
| Initial | OK | OK | OK | OK | OK |
| 1 week | OK | OK | OK | OK | OK |
| 1 month | OK | OK | OK | OK | OK |
| 2 months | OK | OK | OK | OK | OK |
| 3 months | OK | OK | OK | OK | OK |

TABLE 2

| | Comparative Example | | | | | |
|---|---|---|---|---|---|---|
| | 1 | 2 | 3 | 4 | 5 | 6 |
| Initial | OK | OK | OK | OK | OK | OK |
| 1 week | Fair | Fair | Fair | Fair | Fair | Fair |
| 1 month | NG | NG | NG | NG | NG | NG |
| 2 months | NG | NG | NG | NG | NG | NG |
| 3 months | NG | NG | NG | NG | NG | NG |

There has been described an organopolysiloxane composition loaded with a surface coated inorganic filler, which is effective for preventing the filler from settling down even during long-term storage.

Japanese Patent Application No. 2002-110496 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. An organopolysiloxane composition comprising an organopolysiloxane as a base polymer and an inorganic filler which has been surface coated with an addition cure silicone composition in the cured state, said organopolysiloxane composition being selected from curable organopolysiloxane compositions of condensation cure, addition cure, organic peroxide cure and radiation cure types.

2. The organopolysiloxane composition of claim 1 wherein 100 parts by weight of the inorganic filler has been coated with 1 to 1,000 parts by weight of the addition cure silicone composition.

3. The organopolysiloxane composition of claim 1 wherein said addition cure silicone composition comprises
   (A) 100 parts by weight of an organopolysiloxane having at least two alkenyl groups in a molecule,
   (B) an organohydrogenpolysiloxane having at least two hydrogen atoms each attached to a silicon atom (SiH groups) in a molecule, in such an amount as to give 0.3 to 10 moles of SiH groups per mole of alkenyl groups in the organopolysiloxane (A), and
   (C) a catalytic amount of an addition reaction catalyst.

4. The organopolysiloxane composition of claim 1 wherein the inorganic filler is selected from the group consisting of a metal, metal oxide, metal hydroxide, nitride and mixtures thereof.

5. The organopolysiloxane composition of claim 4 wherein the metal is selected from the group consisting of silver, copper, aluminum and mixtures thereof.

6. The organopolysiloxane composition of claim 4 wherein the metal oxide is aluminum oxide, titanium oxide or both.

7. The organopolysiloxane composition of claim 4 wherein the metal hydroxide is aluminum hydroxide.

8. The organopolysiloxane composition of claim 4 wherein the nitride is boron nitride, aluminum nitride or both.

9. An organopolysiloxane composition comprising a diorganopolysiloxane blocked at either end of the molecular chain with a hydroxyl group or an organoxy group, a silane or siloxane compound having at least two hydrolyzable groups in a molecule, a curing catalyst, and an inorganic filler which has been surface coated with an addition cure silicone composition in the cure state.

10. An organopolysiloxane composition comprising an organopolysiloxane having at least two alkenyl groups, an organohydrogenpolysiloxane having at least two hydrogen atoms each attached to a silicon atom in a molecule, a curing catalyst, and an organic filler which has been surface coated with an addition cure silicone composition in the cured state.

11. An organopolysiloxane composition comprising an organopolysiloxane, an organic peroxide, and an organic filler which has been surface coated with an addition cure silicone composition in the cured state.

12. An organopolysiloxane composition comprising an organopolysiloxane containing at least two groups selected from the class consisting of aliphatic unsaturated groups, mercapto group, epoxy group and hydrosilyl groups at the end of and/or within the molecular chain, a reaction initiator, and an organic filler which has been surface coated with an addition cure silicone composition in the cured state.

* * * * *